United States Patent
Huang

(10) Patent No.: US 6,272,789 B1
(45) Date of Patent: Aug. 14, 2001

(54) MICE-CATCHING CAGE

(76) Inventor: Jung-Chang Huang, 22 Lane 1, Chan Nan South Road Sec. 3 Chin Fun Village, Fun Yuan Hsiang, Chan Hua Hsien (TW)

( * ) Notice: Subject to any disclaimer, the term of this patent is extended or adjusted under 35 U.S.C. 154(b) by 0 days.

(21) Appl. No.: 09/586,759

(22) Filed: Jun. 5, 2000

(51) Int. Cl.[7] .................................................. A01M 23/08
(52) U.S. Cl. .................................................................. 43/58
(58) Field of Search ................................... 43/58, 60, 61, 43/65, 66

(56) References Cited

U.S. PATENT DOCUMENTS

| | | | |
|---|---|---|---|
| 1,155,842 | * | 10/1915 | Shadley . |
| 1,497,883 | * | 6/1924 | Sosbe . |
| 2,529,589 | * | 11/1950 | Biery . |
| 3,394,487 | * | 7/1968 | Wood et al. . |
| 4,162,588 | * | 7/1979 | Wyant . |
| 5,682,705 | * | 11/1997 | Stahl . |
| 5,979,105 | * | 11/1999 | Marks ....................................... 43/61 |

* cited by examiner

*Primary Examiner*—Thomas Price
(74) *Attorney, Agent, or Firm*—Harrison & Egbert

(57) ABSTRACT

A mice-catching cage including a plurality of compartments, which are disposed at various levels and are provided with a one-way guide path which is in turn provided with an entrance pathway. The entrance pathway is provided in the bottom with a support plate on which an inclined door plate is supported. The inclined door plate is provided in an underside with a weight attached thereto for tilting the inclined door plate. The entrance pathway is provided in the top wall with a stop plate for forming a one-way path along with the inclined door plate upon entrapment of a mouse.

3 Claims, 6 Drawing Sheets

MICE-CATCHING CAGE

BACKGROUND OF THE INVENTION

1. Field of the Invention

The present invention relates to a cage for use in catching mice.

2. Description of Related Art

The conventional cages for catching mice are generally provided with an entrance to entice a mouse to enter the interior of the cage. The entrance is provided with a door which is closed with a lot of noise upon entrapment of a mouse. Such noise can often scare away other mice at large.

BRIEF SUMMARY OF THE INVENTION

The primary objective of the present invention is to provide a mice-catching cage which is free from the drawback of the conventional mice-catching cages described above.

The mice-catching cage of the present invention comprises a plurality of compartments, with each having a plurality of entrances which are provided with an inclined door plate for forming a one-way path upon entrapment of a mouse.

The features and the advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
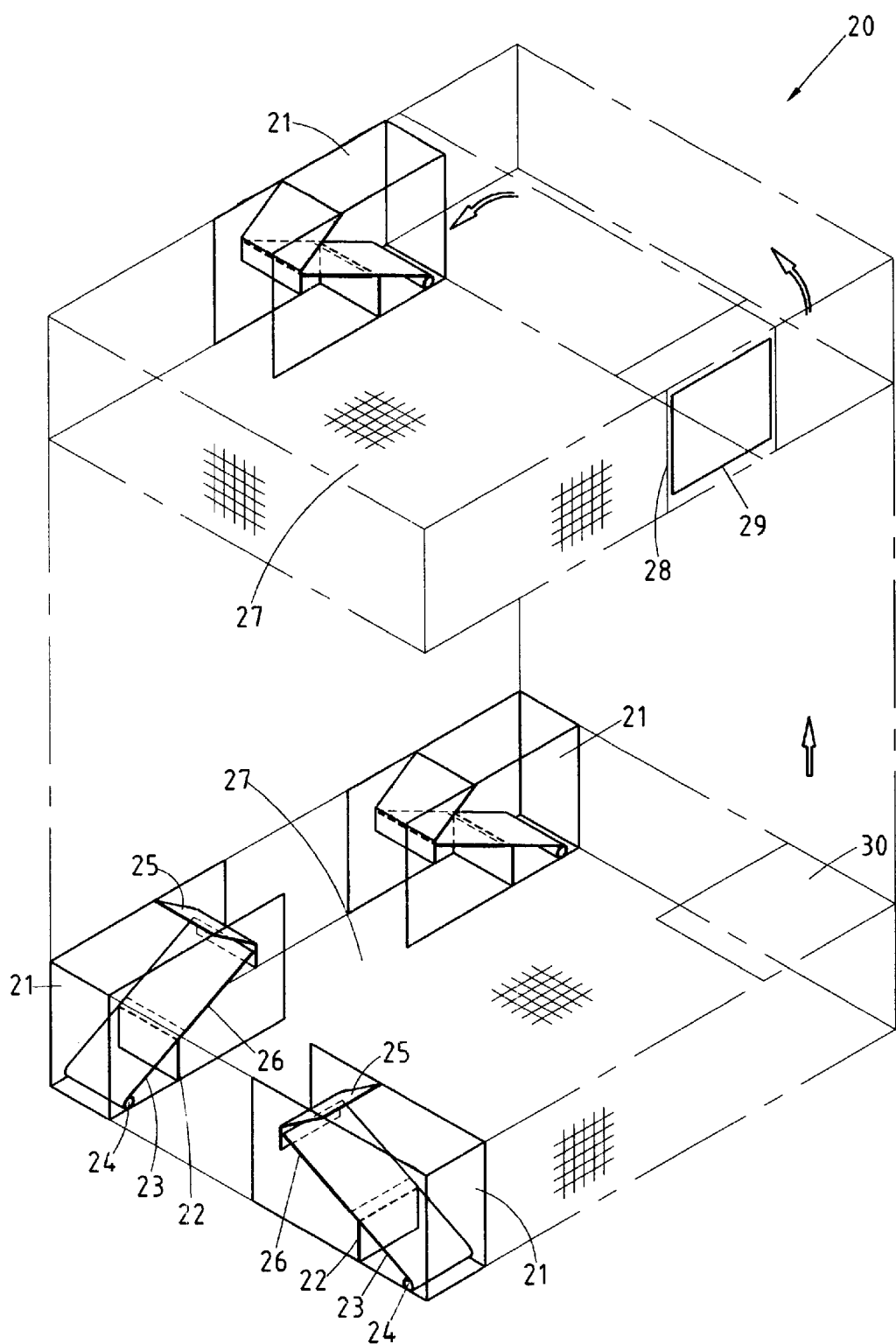
FIG. 1 shows a perspective view of the preferred embodiment of the present invention.
Figure 2:
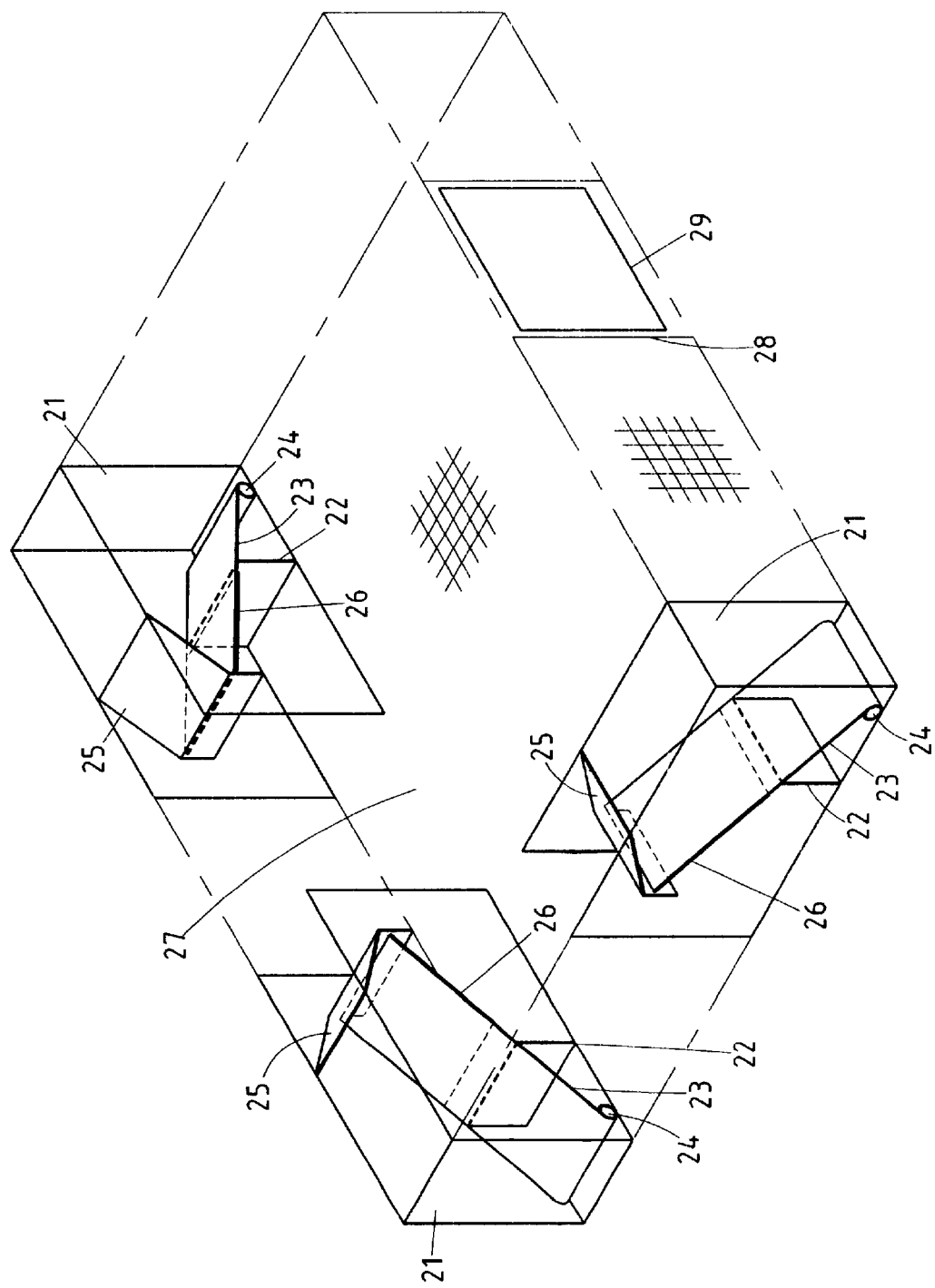
FIG. 2 shows a perspective view of one compartment of the preferred embodiment of the present invention.
Figure 3:
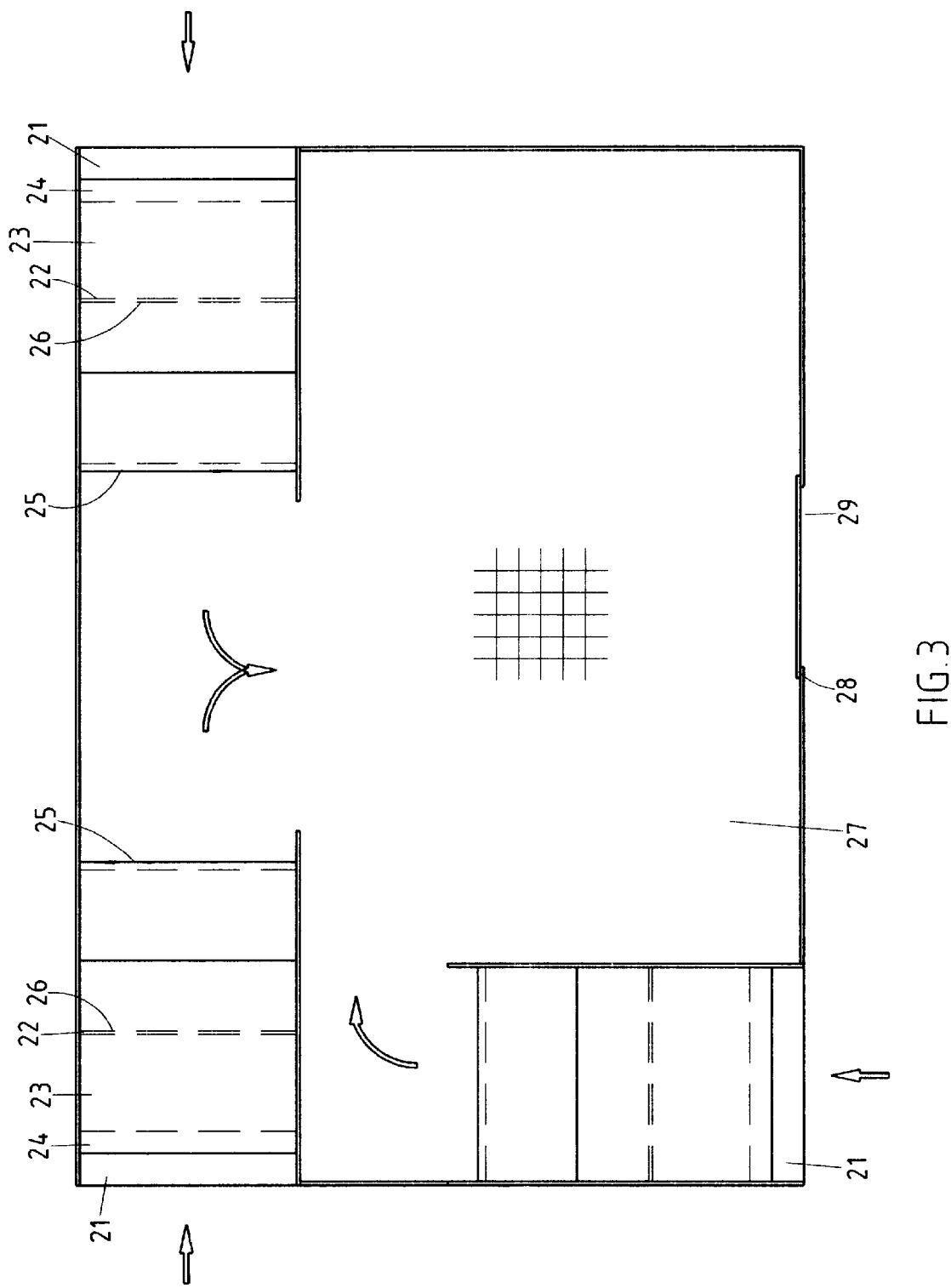
FIG. 3 shows a top view of the compartment of the preferred embodiment of the present invention.
Figure 4:
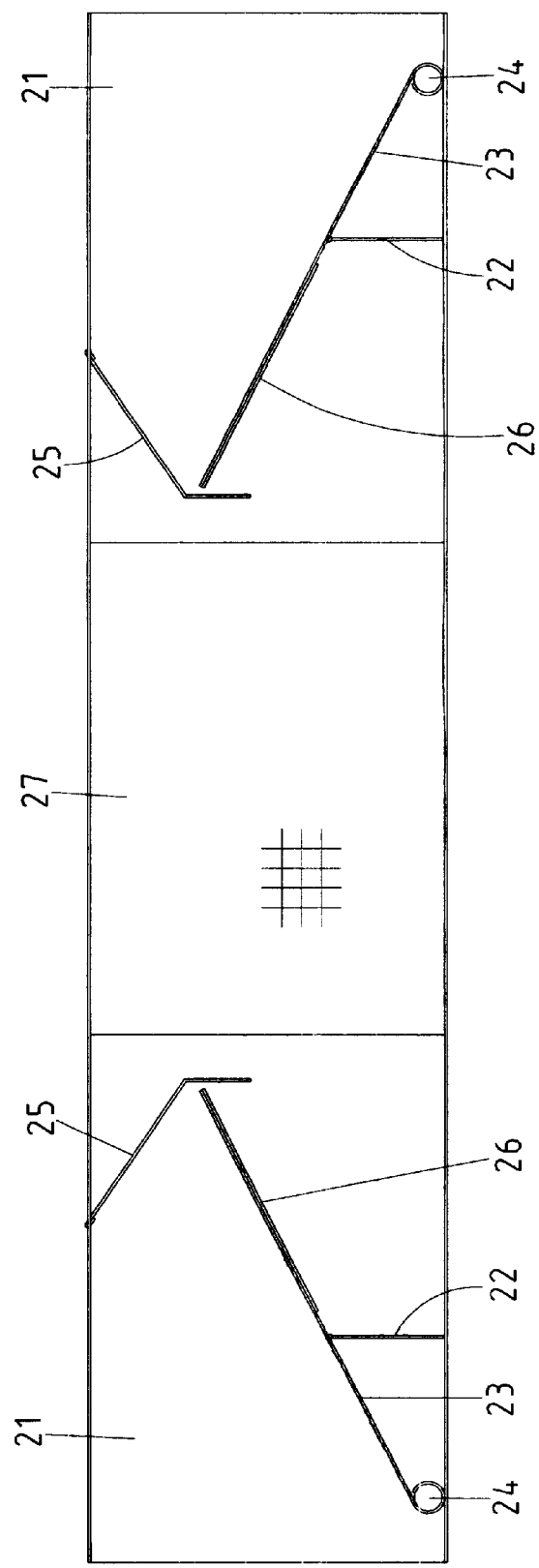
FIG. 4 shows a side view of the compartment of the preferred embodiment of the present invention.
Figure 5:
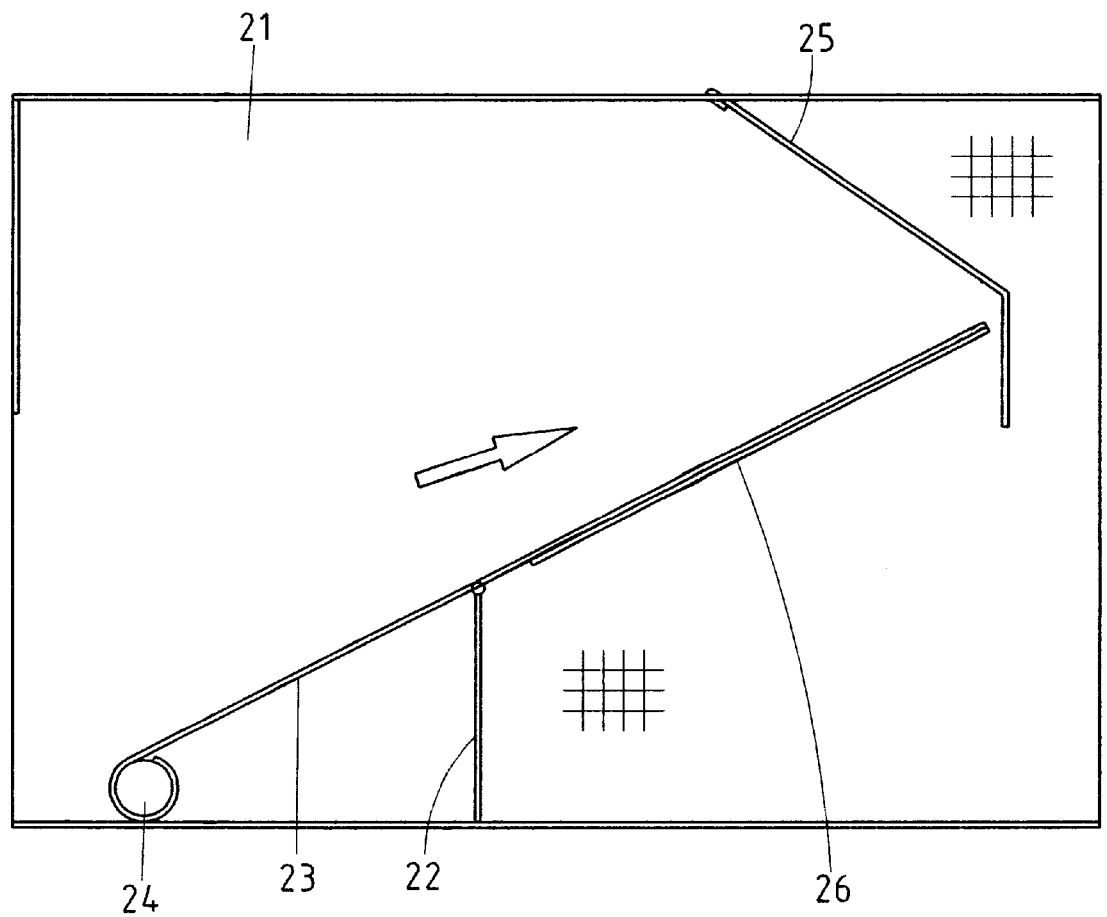
FIG. 5 shows a side view of an entrance pathway of the preferred embodiment of the present invention.
Figure 6:
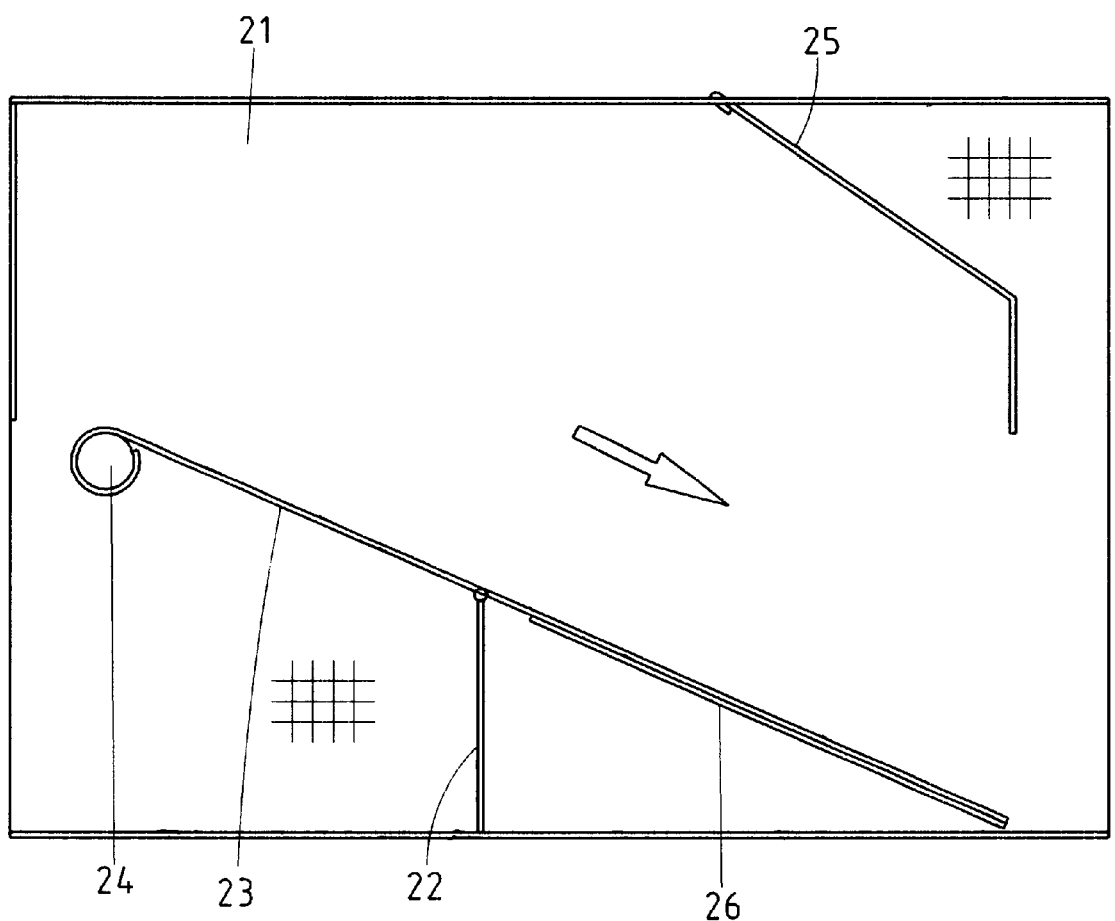
FIG. 6 shows a schematic view of the entrance pathway of the preferred embodiment of the present invention at work.

As shown in all drawings provided herewith, a mice-catching cage 20 embodied in the present invention comprises a plurality of compartments 27, which are disposed at various levels of the cage 20 and are provided with a one-way guide path 30 having an entrance pathway 21. The entrance pathway 21 is provided in the bottom with a support plate 22 on which an inclined door plate 23 is supported. The inclined door plate 23 is provided in the underside of the outer end with a weight 24 fastened thereto for tilting the inclined door plate 23. The entrance pathway 21 is provided in the top wall with a stop plate 25 for forming a one-way path along with the inclined door plate 23 upon entrapment of a mouse.

If the inclined door plate 23 is of a netlike construction, the underside of the inclined door plate 23 must be provided with a smooth face plate 26 for preventing the inclined door plate 23 from being caught, thereby causing the entrance pathway 21 to be accidentally opened. The cage 20 may be provided with one or more entrance pathways 21 for multiple entrapments of mice. Each compartment 27 of the cage 20 is provided with an exit 29 having a door 28. The exit 29 is intended for use in removing the entrapped mice from the compartment 27.

The embodiment of the present invention described above is to be regarded in all respects as being merely illustrative and not restrictive. Accordingly, the present invention may be embodied in other specific forms without deviating from the spirit thereof. The present invention is therefore to be limited only by the scope of the following appended claims.

I claim:

1. A mice-catching cage comprising:
   a plurality of compartments disposed at different levels from each other, each of said plurality of compartments comprising:
      an entrance opening;
      a pathway formed at a bottom of the compartment and extending inwardly from said entrance opening;
      a support plate extending vertically upwardly from said pathway;
      an inclined plate pivotally supported by said support plate at an end of said support plate opposite said pathway;
      a weight affixed to an underside of said inclined plate at an end of said inclined plate adjacent said entrance opening, said weight urging said end of said inclined plate against said pathway; and
      a stop plate affixed within the compartment so as to extend from a top of the compartment downwardly toward an opposite end said inclined plate, said inclined plate pivotable so as to have said opposite end against said pathway upon an application of a weight of a mouse upon a surface said inclined plate adjacent said opposite end.

2. The cage of claim 1, aid inclined plate being of a netlike construction, said inclined plate having a smooth face plate affixed to an underside thereof.

3. The cage of claim 1, each of said plurality of compartments further comprising:
   an exit opening to the compartment; and
   a door releasably affixed over said exit so as to selectively allow for a removal of a mouse from the compartment.

* * * * *